(12) United States Patent
Bish et al.

(10) Patent No.: US 8,234,464 B2
(45) Date of Patent: Jul. 31, 2012

(54) HYBRID STORAGE DATA MIGRATION BY SELECTIVE DATA REMOVAL

(75) Inventors: Thomas William Bish, Tucson, AZ (US); Katsuyoshi Katori, Kanagawa (JP); David Michael Morton, Tucson, AZ (US); Yun Mou, Tucson, AZ (US); Jonathan Wayne Peake, Tucson, AZ (US); Joseph M Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/613,445

(22) Filed: Nov. 5, 2009

(65) Prior Publication Data

US 2011/0107045 A1    May 5, 2011

(51) Int. Cl.
*G06F 13/14* (2006.01)
(52) U.S. Cl. .......................................... 711/161; 162/155
(58) Field of Classification Search .................. None
See application file for complete search history.

(56) References Cited

U.S. PATENT DOCUMENTS

| | | | | |
|---|---|---|---|---|
| 6,081,812 | A | 6/2000 | Boggs et al. .................. | 707/202 |
| 7,007,048 | B1 | 2/2006 | Murray et al. ................ | 707/204 |
| 7,080,221 | B1 | 7/2006 | Todd et al. .................... | 711/161 |
| 7,293,154 | B1 | 11/2007 | Karr et al. ..................... | 711/202 |
| 2006/0010169 | A1* | 1/2006 | Kitamura ..................... | 707/200 |
| 2007/0050548 | A1* | 3/2007 | Bali et al. ...................... | 711/118 |
| 2007/0050569 | A1 | 3/2007 | Haustein et al. .............. | 711/154 |
| 2007/0186048 | A1* | 8/2007 | Nakanishi et al. ........... | 711/137 |
| 2007/0283090 | A1 | 12/2007 | Kaji et al. ...................... | 711/114 |
| 2008/0162821 | A1* | 7/2008 | Duran et al. .................. | 711/133 |
| 2008/0225740 | A1* | 9/2008 | Martin et al. ................. | 370/252 |
| 2009/0276607 | A1* | 11/2009 | Bonola ......................... | 712/209 |
| 2010/0088467 | A1* | 4/2010 | Lee et al. ...................... | 711/104 |

OTHER PUBLICATIONS

INSPEC: Data ONTAP GX: a scalable storage cluster — AN-9388066; Eisler, M. et al. 2007, pp. 139-152.
ACM Digital Library: PNUTS: Yahoo's Hosted Data Serving Platform, Cooper, BF, et al.; Aug. 2008, pp. 1277-1288.
ACM Digital Library: Planning Spatial Workflows to Optimize Grid Performance, Meyer, L. et al.; Apr. 2006, pp. 786-790.
ACM Digital Library: Experience Distributing Objects in an SMMP OS, Appavoo et al.; Aug. 2007, vol. 25, No. 3, Article 6.

* cited by examiner

*Primary Examiner* — Than Nguyen
(74) *Attorney, Agent, or Firm* — John H. Holcombe

(57) ABSTRACT

A hybrid data storage system is one which has data storage clusters of different types. In a hybrid data storage system, at least one first data storage cluster is configured to store data and has high data storage capacity; and at least one second data storage cluster is configured to store data and has lower data storage capacity than the first cluster. The data is initially replicated and stored by at least one first and at least one second data storage cluster. The method identifies a portion of the stored initially replicated data of at least one second data storage cluster as "pinned"; continues to store the pinned initially replicated data; and selectively removes non-pinned initially replicated data from the second data storage cluster(s) to account for the capacity difference.

22 Claims, 5 Drawing Sheets

HYBRID STORAGE DATA MIGRATION BY SELECTIVE DATA REMOVAL

DOCUMENT INCORPORATED BY REFERENCE

Commonly assigned application Ser. No. 11/697,004, U.S. Patent Application Publication 2008/0250197, illustrates a multi-cluster data storage system.

FIELD OF THE INVENTION

This invention relates to data storage systems, and more particularly to handling replicated data in a data storage system.

BACKGROUND OF THE INVENTION

In a data storage system having a plurality of clusters, each cluster configured to store data, logical volume data written to one cluster may optionally replicated to one or more peer clusters of the data storage system. For users that demand short recovery times to access the data, copies tend to be made to all clusters in a common grid. From a cluster data capacity perspective, all clusters typically need the same storage capacity in order to absorb new user data as well as absorb all replicas of data written at peer clusters.

A cluster may come in different forms, for example, a "disk-only" solution configured to store data with short recovery time to access data, and a "complete" solution configured to both store data with a short recovery time to access data, such as disk and solid state disk, and to store data with high capacity and longer recovery time to access data, such as a data storage library. Data may be migrated and archived from the short recovery time storage to the library. Because of the different characteristics of the clusters, it is typically required that all the clusters in a grid data storage system be of the same type.

SUMMARY OF THE INVENTION

Hybrid data storage systems, methods, and data storage controls are provided which can handle data storage with clusters of different types, comprising a hybrid data storage system.

In one embodiment, a method operates a data storage system having a plurality of data storage clusters, at least one first data storage cluster configured to store data and having high data storage capacity; and at least one second data storage cluster configured to store data and having lower data storage capacity than the first cluster. The data is initially replicated and stored by at least one first and at least one second data storage cluster. The method identifies a portion of the stored initially replicated data of at least one second data storage cluster as "pinned"; continues to store the pinned initially replicated data; and selectively removes non-pinned initially replicated data from the second data storage cluster(s) to account for the capacity difference.

In another embodiment, at least another portion of the initially replicated data is identified as "pinned for a limited period of time"; and the identified data is stored for at least a predetermined limited period of time from initial storage of the data.

In a further embodiment, non-pinned initially replicated data is selectively removed from at least one second data storage cluster in accordance with a threshold related to the available data storage capacity of the second data storage cluster and the amount of data currently stored by the second data storage cluster.

In another embodiment, the method stops selectively removing the non-pinned data at a second threshold.

In a further embodiment, the second threshold is related to the amount of data removed.

In another embodiment, the method additionally comprises, if one of the clusters will become unavailable, establishing at a second data storage cluster, a pre-removal threshold at a lesser amount of the data currently stored by the second data storage cluster.

In still another embodiment, the method arranges the non-pinned initially replicated data into at least two groups of data; and selectively removes only the data of one of the groups until the total of the data has been removed, and then selectively removes data of another of the groups.

In another embodiment, the method comprises identifying selected data of the initially replicated data as "scratch" data, without regard to whether the data is also identified as "pinned" or as non-pinned data; and selectively removing the "scratch" data before removing the non-scratch non-pinned data.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
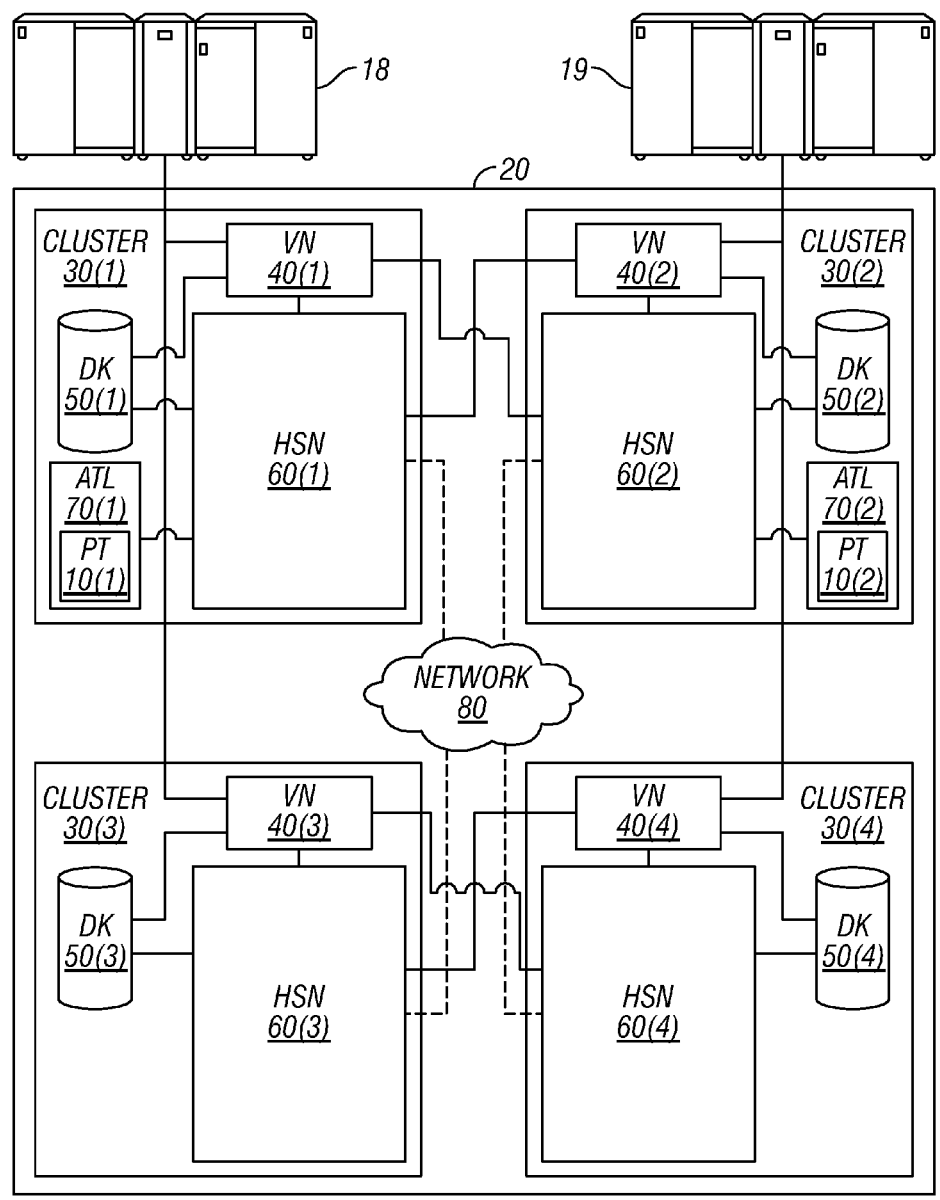
FIG. 1 illustrates one embodiment of a data storage system in accordance with the present invention.
Figure 2:
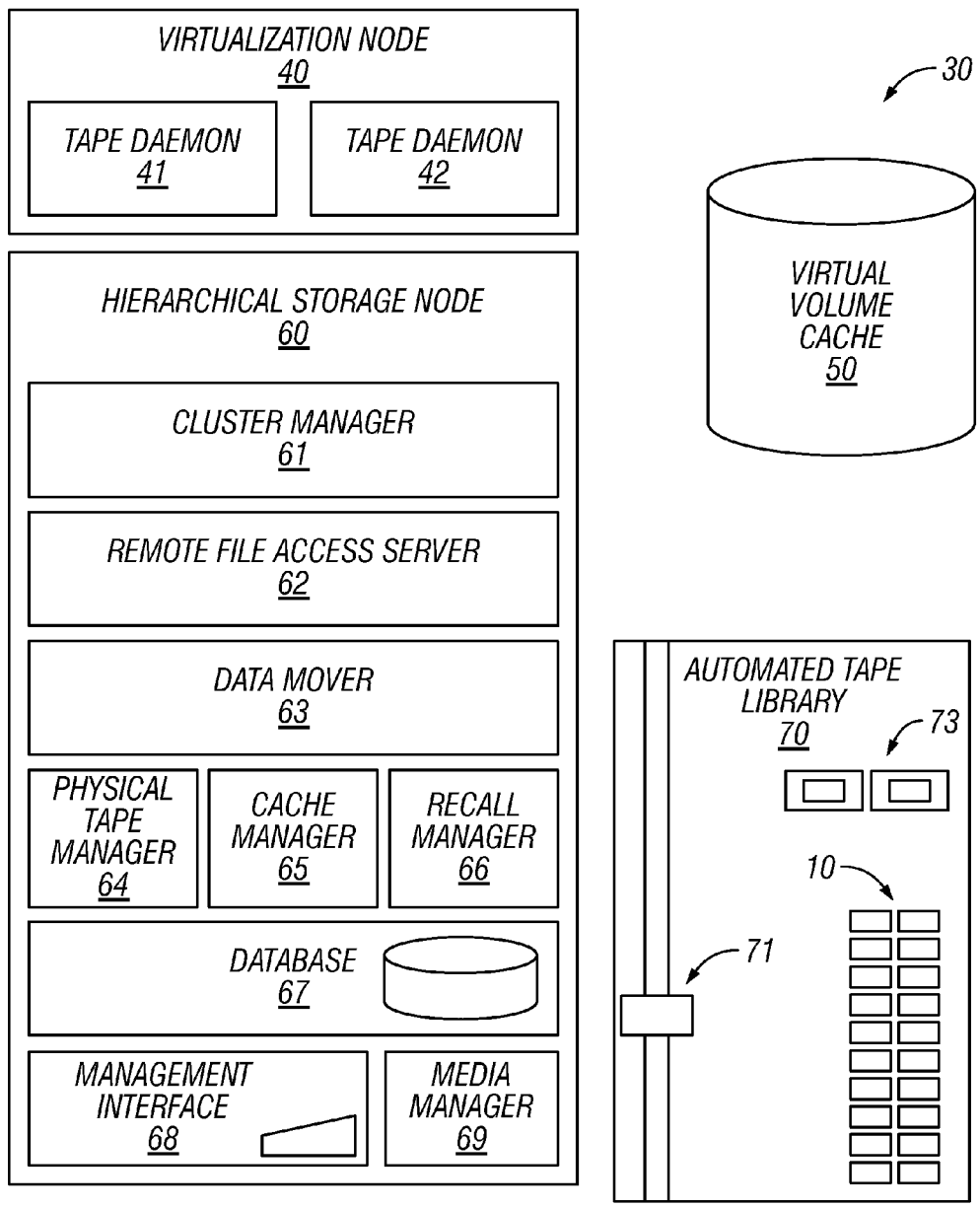
FIG. 2 illustrates one embodiment of a virtual tape server in accordance with the present invention.
Figure 3:
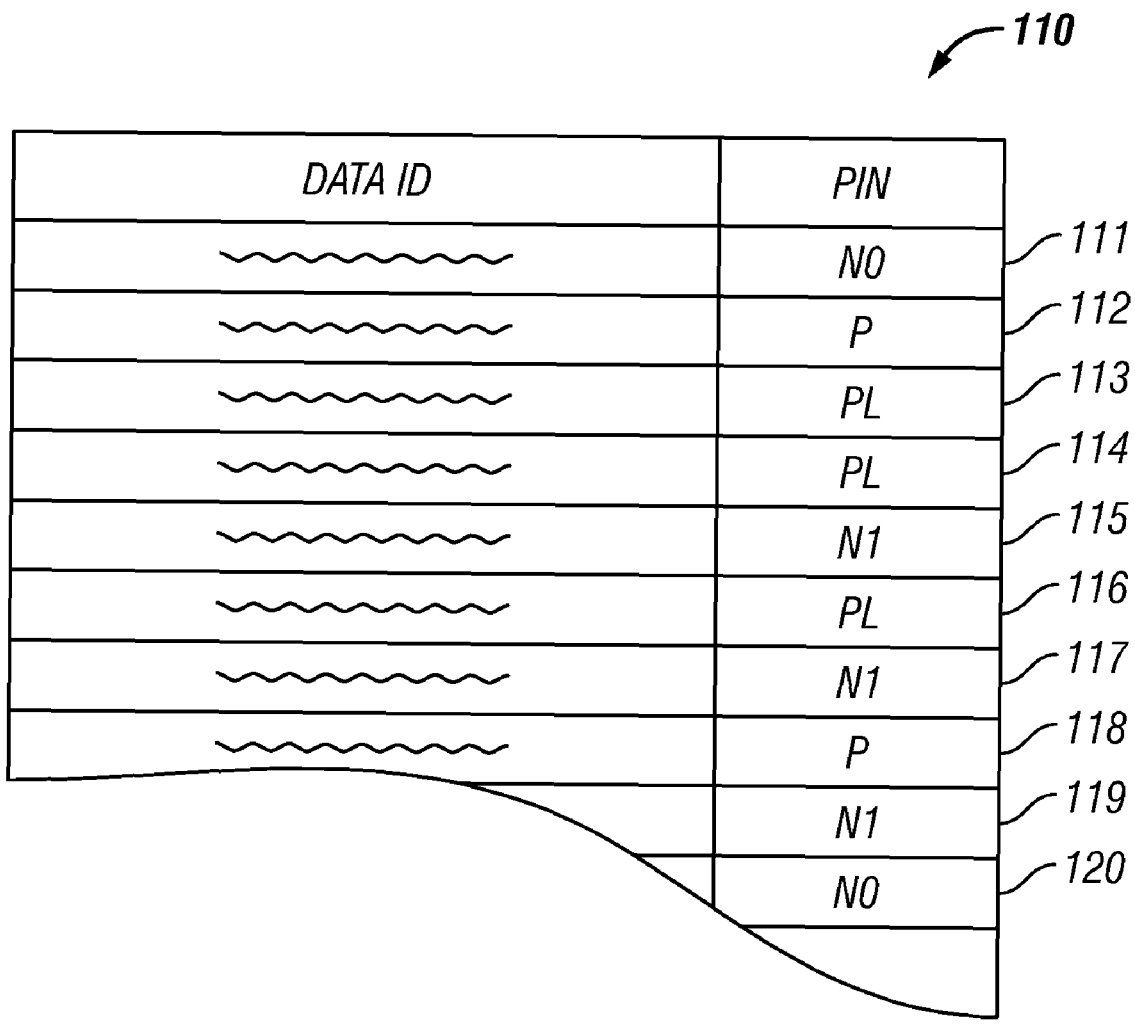
FIG. 3 illustrates a table employed by the data storage system of FIG. 1.
Figure 4A:
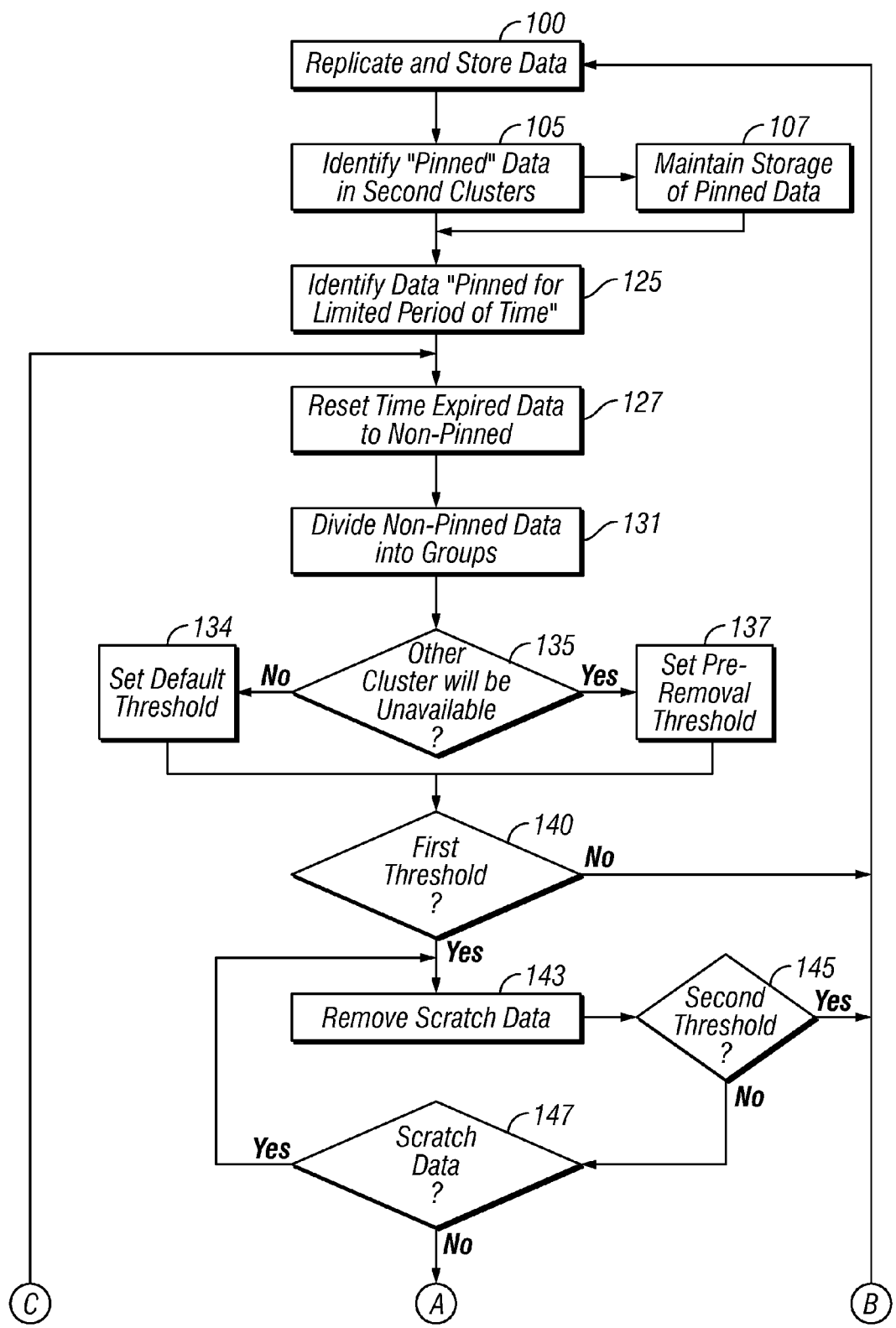
FIGS. 4A and 4B illustrate a flow chart depicting an exemplary method of operating the system of FIGS. 1 and 2.
Figure 4B:
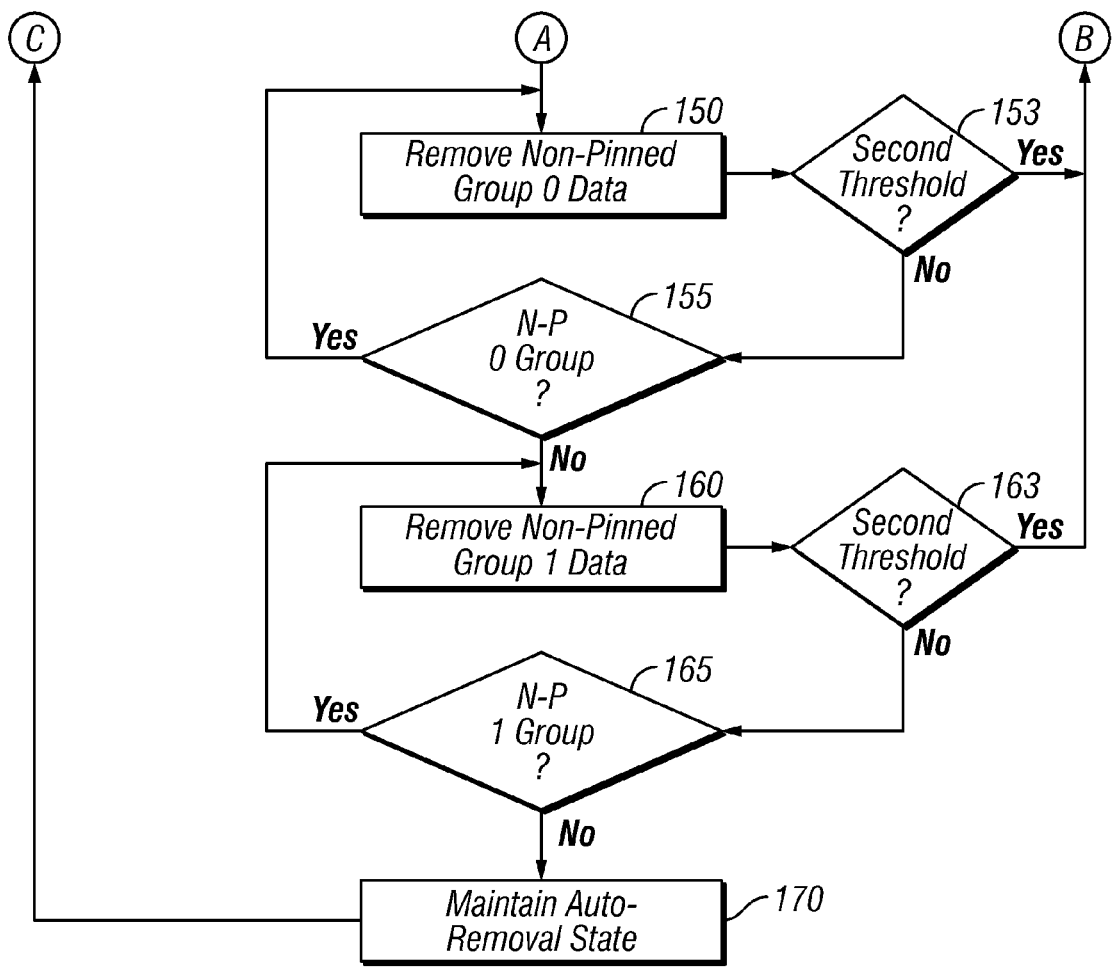

Referring to FIGS. 1 and 2, the data storage system 20 provides storage for a plurality of host systems 18, 19. The data storage system 20, in one embodiment, comprises a hybrid system which employs four (4) virtual tape server clusters 30, with clusters 30(1) and 30(2) having automated tape libraries ("ATL") 70(1) and 70(2), and clusters 30(3) and 30(4) without automated tape libraries. The clusters are interconnected by a network 80 with each cluster 30 including a virtualization node ("VN") 40 and a disk storage ("DK") 50 for emulating a tape drive or tape library to hosts 18, 19. In one embodiment, the disk storage 50(3) and 50(4) for clusters 30(3) and 30(4) comprise substantially greater data storage capacity than disk storage 50(1) and 50(2) of clusters 30(1) and 30(2). Clusters 30(1) and 30(2) further comprise a hierarchical storage node ("HSN") 60(1) and 60(2) for locally moving data between disk storage 50 and the automated tape library ("ATL") 70 as well as remotely moving data between local disk storage 50 and a remote disk storage 50, and clusters 30(3) and 30(4) comprise a hierarchical storage node ("HSN") 60(3) and 60(4) for handling the data of the disk storage 50 as well as moving data between local disk storage 50 and a remote disk storage 50. Examples of disk storage 50 comprise one or more disk drives, for example, arranged as a redundant array of independent disks (RAID) or just a bunch of disks (JBOD), or solid state disk (SSD), etc.

In one exemplary embodiment, as shown in FIG. 2, disk 50 serves as a virtual volume cache containing virtual volumes for local and remote access thereto. Library 70 of clusters 30(1) and 30(2) comprises a robotic accessor 71 for mounting physical tapes ("PT") 10 in physical tape drives 73 for access to physical volumes stored in physical tapes 10.

Virtualization node 40 employs a pair of tape daemons 41 and 42 for operating on virtual volume files residing in either local cache 50 or a remote cache 50 as directed by host 18 or host 19, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via tokens that are stored in each cluster's database 67 to determine which cluster 30 has a current copy of data and coordinates copying of data between clusters 30. Remote file access server 62 provides a link to cache 50 by a remote cluster 30. Data mover 63 controls the actual data transfer operations for copies performed between clusters 30 and transfers of data between cache 50 and library 70.

Physical tape manager 64 is provided in clusters 30(1) and 30(2) and manages physical tapes in library 70 in multiple physical volume pools, controls reclamation, borrows/returns volumes from a scratch pool, and controls movement of physical tapes 10 between pools. In clusters 30(1) and 30(2), cache manager 65 controls a copying of data between cache 50 and library 70. Recall manager 66 queues and controls recalls of data into cache 50 from library 70 on behalf of virtualization node 40 and cluster manager 61. Media manager 69 manages the handling of physical tapes 10 and error recovery, and diagnoses errors and determines if the errors were caused by a physical tape drive 73 of library 70 or a physical tape media 10 to thereby take appropriate action.

Cache manager 65 for each of the clusters 30 controls removal of data in cache 50, and provides control signals to balance data flow between cache 50 and other node 60 components.

Management interface 68 provides information about VTS cluster 30 and allows a user control and configuration of cluster 30.

An example of a data storage system which may be rearranged in accordance with the present invention is discussed in the incorporated '004 Application, and another example comprises the IBM® 7700 Virtual Tape Server.

A hybrid data storage system provides both short recovery times to access a large amount of data with a large cache 50(3) and/or 50(4), and high capacity data storage and longer recovery time to access the data, with a data storage library 70(1) and/or 70(2). Data is initially replicated between at least one cluster 30(1), 30(2) with the data storage library and at least one cluster 30(3), 30(4) with the large cache. The initially replicated data is stored at high rates to each of the caches 50 of both the first high capacity cluster 30(1), 30(2), and of the second short recovery time cluster 30(3), 30(4). The data of the large capacity cluster may be migrated and archived from the cache 50(1) and 50(2) to the library 70(1) and 70(2).

The entirety of the replicated data is unlikely to be able to be maintained in a lower capacity large cache cluster over time. As a tactical solution, a user may configure its replication policies to only replicate critical data to the lower capacity large cache cluster, or may provide archival data only to the high capacity cluster. A downside of having different destinations, such as remote destinations, of the different data types of data, is that inbound data handling performance may be less than optimal.

The present invention is directed at selectively removing initially replicated data from the lower data storage capacity second data storage cluster 30(3), 30(4). This will open up storage space in the lower capacity cluster to allow the user to submit data at an optimal performance level to both types of clusters, and the data storage system will handle the data.

Referring to FIGS. 1, 2, 3, 4A and 4B, as discussed above, a hybrid data storage system is one which has data storage clusters of different types. In the example, at least one first data storage cluster 30(1), 30(2) is configured to store data and has high data storage capacity; and at least one second data storage cluster 30(3), 30(4) is configured to store data and has lower data storage capacity than the first cluster.

In step 100, the data is initially replicated and stored by at least one first and at least one second data storage cluster. Herein, "initially replicated" comprises data that is provided to the data storage system and replicated to at least two clusters for the first time, or previously stored data that has been accessed and updated and the updates are replicated. For example, the data is initially stored at the cache storage 50 of each of the clusters. Data stored in cache storage 50(1), 50(2) of large capacity clusters 30(1), 30(2) is subject to be migrated, for example, to the automated tape library 70(1), 70(2).

Since the total storage capacity of the second data storage cluster(s) 30(3), 30(4) is less than that of the first data storage cluster(s) 30(1), 30(2), data is removed from the second data storage cluster(s) to account for the capacity difference and not overrun the cache.

In step 105, the method, for example conducted by the hierarchical storage node 60(3) and 60(4), identifies a portion of the stored initially replicated data of at least one second data storage cluster 30(3), 30(4) as "pinned"; and in step 107, continues to store the pinned initially replicated data, such that the pinned data is not removed from storage. Non-pinned initially replicated data is the subject of possible removal from the second data storage cluster(s). The user may determine the type of data that is to be pinned, and communicate the determination to the data storage system via a host 18, 19, or directly at a terminal of a second data storage cluster 30(3), 30(4), or via network 80. Pinned data is data that is maintained at the maximum amount of replication by being stored in the large capacity cluster(s) 30(1), 30(2), and being maintained as pinned in the lower capacity cluster(s) 30(3), 30(4), and not removed.

The HSN 60(3), 60(4), for example cache manager 65, may track the pinned status of data, for example, via a table 110 or equivalent tracking device. The data of the data storage system may comprise any suitable arrangement, for example, such as data volumes, data records, data sets, etc. In the example, data volumes 112 and 118 are designated as pinned "P".

In one embodiment, the user may establish a pin-time attribute to some or all of the data, referencing the time that the data is stored in step 100. The pin-time attribute is applied to the data in step 125, and may be called "pinned for a limited period of time", such that the identified data is stored as though it were pinned for a predetermined limited period of time from initial storage or last access of the data. The data may continue to be stored after expiration of the limited period of time until it is removed, as will be discussed. The pin-time attribute accommodates recovery point objectives in which all or certain data is critical for a duration of time and then becomes less critical. The time, for example in hours, is a grace period applied to the data since its storage or last access where it is temporarily pinned until the grace period has passed. Referring to table 110, data volumes 113, 114 and 116 are designated as pinned for a limited period of time "PL".

In step 127, data whose grace period has expired are reset from pinned for a limited period of time to "non-pinned".

In step 131, the non-pinned data may be divided into priority or preference groups "N0" and "N1". Additional levels of priority or preference may be employed as well. In one embodiment, removal group "N0" is the first group of non-pinned data to be removed, for example, in LRU (Least Recently Used) order, and only after all N0 data has been removed or attempted to be removed without success, "N1" data is removed, again in LRU order until an objective is met. In table 110, non-pinned data "N" is divided into "N0" data 111 and 120, and "N1" data 115, 117 and 119.

In one embodiment, the data storage system operates in one mode in normal circumstances and a different mode if one of the clusters will become unavailable. Thus, in normal operation, non-pinned data is removed if the active data content of the cache-only second cluster reaches a first threshold related to the available data storage capacity of the second data storage cluster and the amount of data currently stored by the second data storage cluster, for example, comprising a level of 95% less two terabytes (95%−2 TB) full. Once the cache crosses this boundary, auto-removal of data is triggered and removes data until the objective of a second threshold is reached, for example, comprising a post-removal threshold at which the active data content is half a terabyte lower than the first threshold, for example 95%−2.5 TB. This default threshold is set in step 134.

However, if one of the other clusters will become unavailable, a more aggressive first threshold is used, called "pre-removal". The pre-removal threshold may be employed on all remaining cache-only clusters so that they can free up enough space to allow production to run while the soon to be unavailable cluster is not present. In one example, the pre-removal first threshold is 75% of full capacity. A cluster may be unavailable for any of many reasons, such as when it is being updated, or a change out of equipment is being conducted, or a condition requires or forces the cluster offline. In one embodiment, one or more of the thresholds is configurable by the user.

Thus, step 135 determines whether a cluster will be unavailable, and, if so, step 137 sets the first threshold instead to the pre-removal threshold.

Step 140 determines whether the first threshold (either the default or pre-removal) has been crossed. If not, the amount of active data is less than the threshold, and the process returns to step 100 to replicate and store additional data.

If, however, step 140 determines that the first threshold has been crossed, for example, at 95% of full capacity, step 143 first looks for "scratch" data to remove. "Scratch" data is known to those of skill in the art, and comprises data that the owner of the data has indicated may be deleted or the reference to the data deleted. In one embodiment, scratch data is always removed first in step 143 until, in step 145, the post-removal (second) threshold has been reached or, in step 147, all of the scratch data has been removed. If step 145 indicates that the second threshold has been reached, the process returns to step 100 to replicate and store additional data. If the second threshold has not been reached, step 147 determines whether scratch data remains that can be removed, and, if so, the process returns to step 143 to remove additional scratch data. Data may be "removed" by any suitable means, including by deleting reference to the data and indicating that the space occupied by the data may be overwritten. Alternatively, the data may be deleted and erased or overwritten.

If all of the available scratch data has been removed, and the second threshold has not been reached, meaning that more data is to be removed, step 150 removes non-pinned group 0 data, for example on an LRU basis, until in step 153, the second threshold has been reached or, in step 155, all of the non-pinned group 0 data has been removed. If step 153 indicates that the second threshold has been reached, the process returns to step 100 to replicate and store additional data. If the second threshold has not been reached, step 155 determines whether non-pinned group 0 data remains that can be removed, and, if so, the process returns to step 150 to remove additional group 0 data.

If all of the available non-pinned group 0 data has been removed, and the second threshold has not been reached, meaning that more data is to be removed, step 160 removes non-pinned group 1 data, for example, on an LRU basis, until in step 163, the second threshold has been reached or, in step 165, the entire non-pinned group 1 data has been removed. If step 163 indicates that the second threshold has been reached, the process returns to step 100 to replicate and store additional data. If the second threshold has not been reached, step 165 determines whether non-pinned group 1 data remains that can be removed, and, if so, the process returns to step 160 to remove additional group 1 data.

If step 165 indicates that all scratch and group 0 and group 1 data have been removed and the second threshold is still not hit, the second cluster will remain in an auto-removal state 170, where only newly indicated scratch data and "PL" data whose grace period has expired will be removed. If more data is written to the cluster via host writes or copies, it will eventually become full and no new input will be accepted.

It will be understood that the cluster may be operated without many of the above steps, or the steps may be conducted in differing sequences. Further, the user, for example, through a host system 18, 19, may provide override commands to directly pin data or directly remove data, or assign data to one group or another, rather than, or in addition to, the storage system cluster.

Thus, a second lower capacity data storage cluster 30(3), 30(4) identifies a portion of stored initially replicated data as "pinned", continues to store the pinned initially replicated data; and selectively removes non-pinned initially replicated data from the cluster.

The implementations may involve software, firmware, micro-code, hardware and/or any combination thereof. The implementation may take the form of code or logic implemented in a medium, such as memory, storage and/or circuitry, for example of hierarchical storage node ("HSN") 60(3), 60(4), where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk—read only memory [CD-ROM], compact disk—read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A hybrid data storage system comprising:
   at least one first data storage cluster configured to store data and having high data storage capacity; and
   at least one second data storage cluster configured to store data and having lower data storage capacity than said first data storage cluster;
   said data initially replicated and stored by at least one said first and at least one said second data storage cluster;
   said at least one second data storage cluster configured to identify a portion of said stored initially replicated data as "pinned", to identify at least another portion of said initially replicated data as "pinned for a limited period of time", and to continue to store said pinned initially replicated data, and to continue to store said identified "pinned for a limited period of time" data for at least a predetermined limited period of time from initial storage or last access of said data; and to selectively remove non-pinned said initially replicated data, and said "pinned for a limited period of time" data for which said predetermined limited period of time has expired and been reset to "non-pinned", from said at least one second data storage cluster.

2. The hybrid data storage system of claim 1, wherein said at least one second data storage cluster is configured to selectively remove said non-pinned initially replicated data from said at least one second data storage cluster in accordance with a threshold related to the available data storage capacity of said second data storage cluster and the amount of said data currently stored by said second data storage cluster.

3. The hybrid data storage system of claim 2, wherein said at least one second data storage cluster is configured to stop selectively removing said non-pinned data at a second threshold.

4. The hybrid data storage system of claim 3, wherein said second threshold is related to the amount of data removed.

5. The hybrid data storage system of claim 1, wherein said at least one second data storage cluster is configured to arrange said non-pinned initially replicated data into at least two groups of data, and to selectively remove only said data of one of said groups until the total of said data of said one group has been removed, and then to selectively remove data of another of said groups.

6. The hybrid data storage system of claim 1, wherein said at least one second data storage cluster is configured to identify selected data of said initially replicated data as "scratch" data, without regard to whether said data is also identified as "pinned" or as non-pinned data, and to selectively remove said "scratch" data before removing non-scratch said non-pinned data.

7. The hybrid data storage system of claim 1, wherein said at least one first data storage cluster comprises at least a data storage library to provide said high capacity data storage.

8. A hybrid data storage system comprising:
   at least one first data storage cluster configured to store data and having high data storage capacity; and
   at least one second data storage cluster configured to store data and having lower data storage capacity than said first data storage cluster;
   said data initially replicated and stored by at least one said first and at least one said second data storage cluster;
   said at least one second data storage cluster configured to identify a portion of said stored initially replicated data as "pinned", and to continue to store said pinned initially replicated data; and to selectively remove non-pinned said initially replicated data from said at least one second data storage cluster;
   wherein said at least one second data storage cluster is configured to selectively remove said non-pinned initially replicated data from said at least one second data storage cluster in accordance with a first threshold related to the available data storage capacity of said second data storage cluster and the amount of said data currently stored by said second data storage cluster; and
   if one of said clusters will become unavailable, establish at said at least one second data storage cluster, a pre-removal threshold at a lesser amount of said data currently stored by said second data storage cluster, and set said first threshold instead to said pre-removable threshold.

9. A method for operating a data storage system having a plurality of data storage clusters, at least one first data storage cluster configured to store data and having high data storage capacity; and at least one second data storage cluster configured to store data and having lower data storage capacity than said first cluster; said data initially replicated and stored by at least one said first and at least one said second data storage cluster; comprising the steps of:
   identifying a portion of said stored initially replicated data of at least one said second data storage cluster as "pinned";
   identifying at least another portion of said initially replicated data as "pinned for a limited period of time";
   continuing to store said pinned initially replicated data;
   continuing to store said identified "pinned for a limited period of time" data for at least a predetermined limited period of time from initial storage or last access of said data; and
   selectively removing non-pinned said initially replicated data, and said "pinned for a limited period of time" data for which said limited period of time has expired and been reset to "non-pinned", from said at least one second data storage cluster.

10. The method of claim 9, additionally comprising: selectively removing said non-pinned initially replicated data from said at least one second data storage cluster in accordance with a threshold related to the available data storage capacity of said second data storage cluster and the amount of said data currently stored by said second data storage cluster.

11. The method of claim 10, additionally comprising: stopping selectively removing said non-pinned data at a second threshold.

12. The method of claim 11, wherein said second threshold is related to the amount of data removed.

13. The method of claim 9, additionally comprising: arranging said non-pinned initially replicated data into at least two groups of data; and selectively removing only said data of one of said groups until the total of said data of said one group has been removed, and then selectively removing data of another of said groups.

14. The method of claim 9, additionally comprising identifying selected data of said initially replicated data as "scratch" data, without regard to whether said data is also identified as "pinned" or as non-pinned data; and selectively removing said "scratch" data before removing non-scratch said non-pinned data.

15. A method for operating a data storage system having a plurality of data storage clusters, at least one first data storage cluster configured to store data and having high data storage capacity; and at least one second data storage cluster configured to store data and having lower data storage capacity than said first cluster; said data initially replicated and stored by at least one said first and at least one said second data storage cluster; comprising the steps of:
  identifying a portion of said stored initially replicated data of at least one said second data storage cluster as "pinned";
  continuing to store said pinned initially replicated data;
  selectively removing non-pinned said initially replicated data from said at least one second data storage cluster;
  selectively removing said non-pinned initially replicated data from said at least one second data storage cluster in accordance with a first threshold related to the available data storage capacity of said second data storage cluster and the amount of said data currently stored by said second data storage cluster; and
  if one of said clusters will become unavailable, establishing at said at least one second data storage cluster, a pre-removal threshold at a lesser amount of said data currently stored by said second data storage cluster, and setting said first threshold instead to said pre-removable threshold.

16. A control system for operating a data storage system having a plurality of data storage clusters, at least one first data storage cluster configured to store data and having high data storage capacity; and at least one second data storage cluster configured to store data and having lower data storage capacity than said first data storage cluster; said data initially replicated and stored by at least one said first and at least one said second data storage cluster; said control system configured to:
  identify a portion of said stored initially replicated data of at least one said second data storage cluster as "pinned";
  identify at least another portion of said initially replicated data as "pinned for a limited period of time";
  continue to store said pinned initially replicated data;
  continue to store said identified "pinned for a limited period of time" data for at least a predetermined limited period of time from initial storage or last access of said data; and
  selectively remove non-pinned said initially replicated data, and said "pinned for a limited period of time" data for which said predetermined limited period of time has expired and been reset to "non-pinned", from said at least one second data storage cluster.

17. The control system of claim 16, wherein said control system is configured to: selectively remove said non-pinned initially replicated data from said at least one second data storage cluster in accordance with a threshold related to the available data storage capacity of said second data storage cluster and the amount of said data currently stored by said second data storage cluster.

18. The control system of claim 17, wherein said control system is configured to: stop selectively removing said non-pinned data at a second threshold.

19. The control system of claim 18, wherein said second threshold is related to the amount of data removed.

20. The control system of claim 16, wherein said control system is configured to: arrange said non-pinned initially replicated data into at least two groups of data; and
  selectively remove only said data of one of said groups until the total of said data of said one group has been removed, and then selectively remove data of another of said groups.

21. The control system of claim 16, wherein said control system is configured to: identify selected data of said initially replicated data as "scratch" data, without regard to whether said data is also identified as "pinned" or as non-pinned data; and selectively remove said "scratch" data before removing non-scratch said non-pinned data.

22. A control system for operating a data storage system having a plurality of data storage clusters, at least one first data storage cluster configured to store data and having high data storage capacity; and at least one second data storage cluster configured to store data and having lower data storage capacity than said first data storage cluster; said data initially replicated and stored by at least one said first and at least one said second data storage cluster: said control system configured to:
  identify a portion of said stored initially replicated data of at least one said second data storage cluster as "pinned";
  continue to store said pinned initially replicated data;
  selectively remove non-pinned said initially replicated data from said at least one second data storage cluster;
  selectively remove said non-pinned initially replicated data from said at least one second data storage cluster in accordance with a first threshold related to the available data storage capacity of said second data storage cluster and the amount of said data currently stored by said second data storage cluster; and
  if one of said clusters will become unavailable, establish at said at least one second data storage cluster, a pre-removal threshold at a lesser amount of said data currently stored by said second data storage cluster, and set said first threshold instead to said pre-removable threshold.

* * * * *